(12) United States Patent
Liu et al.

(10) Patent No.: US 7,597,034 B2
(45) Date of Patent: Oct. 6, 2009

(54) MACHINING METHOD EMPLOYING OBLIQUE WORKPIECE SPINDLE

(75) Inventors: Qing Liu, Shenzhen (CN); Jun-Qi Li, Shenzhen (CN)

(73) Assignees: Hong Fu Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/944,468

(22) Filed: Nov. 23, 2007

(65) Prior Publication Data
US 2009/0044669 A1    Feb. 19, 2009

(30) Foreign Application Priority Data
Aug. 15, 2007    (CN) .................... 2007 1 0201369

(51) Int. Cl.
*B23B 1/00* (2006.01)
*B23B 3/00* (2006.01)

(52) U.S. Cl. .......................................... 82/1.11; 82/118

(58) Field of Classification Search .................... 82/122, 82/1.11, 12, 118; 409/183, 230, 235, 132, 409/199; 407/48, 40, 53, 103, 33, 34, 64; 700/187
See application file for complete search history.

(56) References Cited

U.S. PATENT DOCUMENTS

| | | | | | |
|---|---|---|---|---|---|
| 3,460,435 | A | * | 8/1969 | Dahl et al. | 409/183 |
| 3,912,995 | A | * | 10/1975 | Schmermund | 318/571 |
| 4,591,305 | A | * | 5/1986 | Bergler | 409/175 |
| 5,133,627 | A | * | 7/1992 | Lindsey | 409/26 |

* cited by examiner

*Primary Examiner*—Willmon Fridie
(74) *Attorney, Agent, or Firm*—Frank R. Niranjan

(57) ABSTRACT

An exemplary machining method used to machine a predetermined curved surface on a workpiece (46) comprising: (1) providing a machining apparatus (30), the machining apparatus including a vertical tool spindle (40) for mounting a tool (42) and a workpiece spindle (44) being rotatable in an axis thereof, the tool spindle being rotatable relative to a vertical direction, a rotational axis of the workpiece spindle is oblique relative to a rotational axis of the tool spindle; (2) mounting the workpiece onto the workpiece spindle; (3) driving the spindle and the workpiece spindle to rotate, and positioning the tool corresponding to the workpiece; and (4) driving a machining point of the tool to move on the predetermined curved surface and along a path passing through a top point "P" and any point "Q" of an edge of the predetermined curved surface.

3 Claims, 5 Drawing Sheets

MACHINING METHOD EMPLOYING OBLIQUE WORKPIECE SPINDLE

CROSS-REFERENCE TO RELATED APPLICATIONS

This application is related to four co-pending U.S. patent application Ser. No. 11/944,469, entitled "MACHINING APPARATUS WITH OBLIQUE WORKPIECE SPINDLE", by Qing Liu et al. Such application has the same assignee as the instant application and are concurrently filed herewith. The disclosure of the above-identified applications is incorporated herein by reference.

BACKGROUND OF THE INVENTION

1. Field of the Invention

The present invention relates generally to machining methods employing oblique workpiece spindle and with high precision, and more particularly to a machining method employing oblique workpiece spindle used in super precise machining.

2. Discussion of the Related Art

Molds for forming precise products such as lenses usually have high precision, small size, and small surface roughness etc. A working surface of the mold is usually a curved surface such as a concave spherical surface. Referring to FIG. 4, in a typical method, a grinding wheel 12 is used to grind a mold 14 so as to obtain a smooth working surface. The grinding wheel 12 is disk-shaped. During a machining process, the grinding wheel 12 rotates and moves along a path parallel to a predetermined surface of the mold 14. Shown in FIG. 4, the mold 14 has a small size as described above and the grinding wheel 12 is further smaller than the mold 14. Thus a diameter of the grinding wheel 12 should be very small. However, the grinding wheel 12 with the small diameter has low strength and rigidity. Thus, a precision of the mold 14 will be reduced due to deformation of the grinding wheel 12 when the grinding wheel 12 rotates.

In order to solve the above described problem, another machining method is provided. Referring to FIG. 5, a mold 22 is mounted on a workpiece spindle (not shown), and the workpiece spindle rotates in a Z-axis. A tool 24 is mounted on a tool spindle (not shown) rotating in a T-axis. An angle defined by the Z-axis relative to the T-axis is 45 degrees. That is, the T-axis is oblique relative to the Z-axis. The tool 24 is cylinder-shaped, and the tool 24 machines the mold 22 with a bottom edge thereof. Simultaneously, the tool 24 moves along directions parallel to a Y-axis and the Z-axis. Usually, a size of the tool 24 is relative large. So the tool 24 has a relative high strength and rigidity. However, the tool 24 and the tool spindle are oblique relative to the Z-axis. Thus, a component force of gravity of the tool 24 and tool spindle, in a direction perpendicular to the T-axis, causes shaking of the tool spindle. A machining precision is reduced because of the shaking of the tool spindle. In addition, an expensive, special tool spindle is employed in this method.

Therefore, a new machining method which has a high precision is desired.

SUMMARY

An exemplary machining method used to machine a predetermined curved surface on a workpiece includes: (1) providing a machining apparatus, the machining apparatus including a vertical tool spindle for mounting a tool and a workpiece spindle being rotatable in an axis thereof, the tool spindle being rotatable relative to a vertical direction, a rotational axis of the workpiece spindle is oblique relative to a rotational axis of the tool spindle; (2) mounting the workpiece onto the workpiece spindle; (3) driving the spindle and the workpiece spindle to rotate, and positioning the tool corresponding to the workpiece; and (4) driving a machining point of the tool to move on the predetermined curved surface and along a path passing through a top point and any point of an edge of the predetermined curved surface.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present machining method employing oblique workpiece spindle. Moreover, in the drawings, like reference numerals designate corresponding parts throughout the several views, and all the views are schematic.

DETAILED DESCRIPTION OF THE EMBODIMENTS

Figure 1:
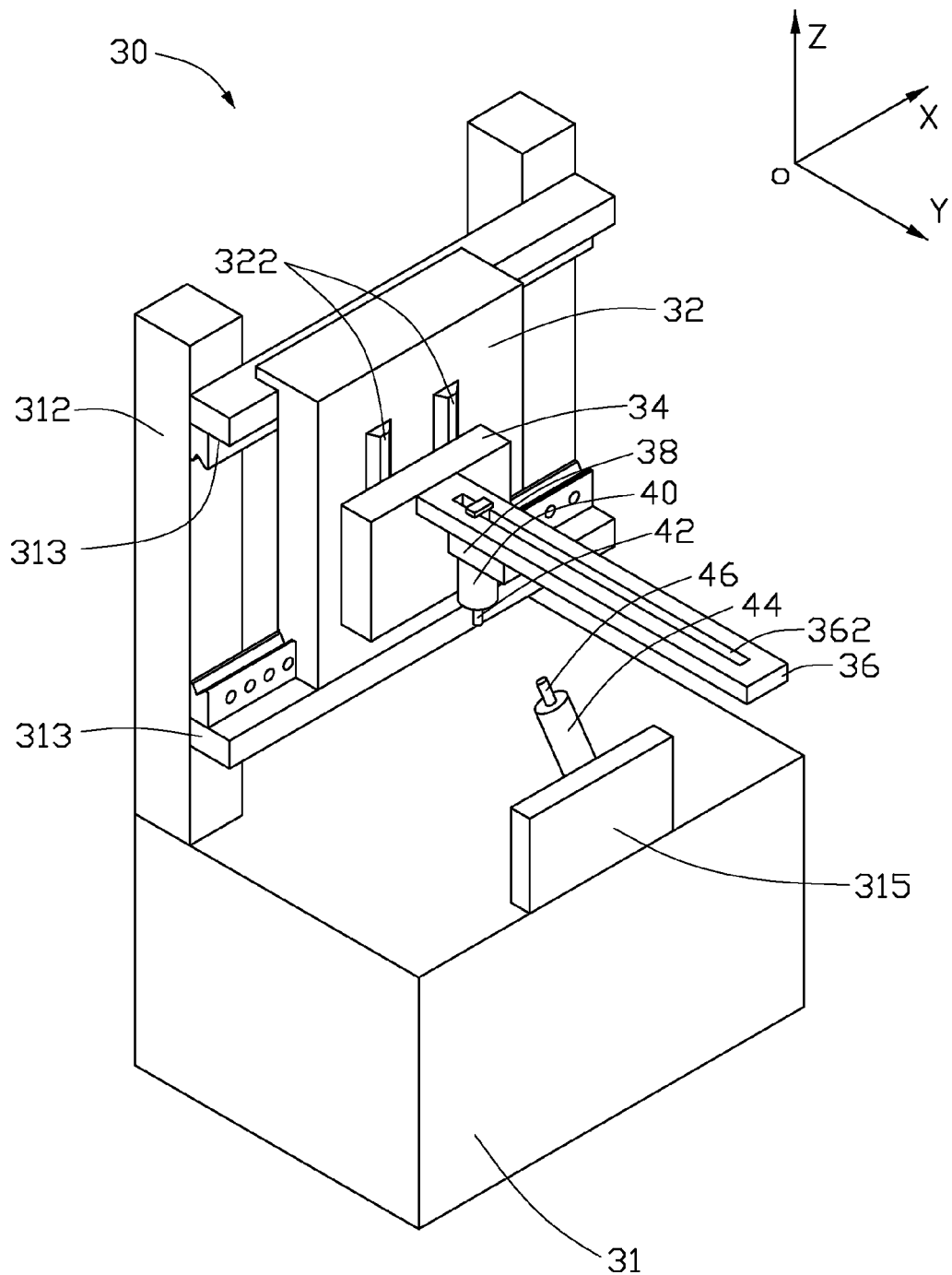
FIG. 1 is an isometric, schematic view of a machining apparatus of the present invention.

Referring to FIG. 1, a machining apparatus 30 includes a base 31, a horizontal slider 32, a vertical slider 34, a lateral crossbeam 36, a lateral slider 38, a tool spindle 40, a tool 42, and a workpiece spindle 44. The machining apparatus 30 is used to machine a workpiece 46.

The base 31 includes two support beams 312, two slide rails 313, and a support 315. The base 31 is approximately a cuboid. The two support beams 312 are separately formed on a top surface of the base 31 extending parallely along the Z-axis. Ends of each slide rails 313 are connected to the two support beams 312 correspondingly, and the slide rails 313 extend horizontally along the X-axis. The support 315 is disposed on the base 31 on another side of the top surface of the base opposite to the slide rails 313.

The horizontal slider 32 is slidable attached on the slide rails 313, and is slidable parallel to the X-axis along the slide rails 313. Two vertical chutes 322 are defined in the horizontal slider 32. The vertical chutes 322 extend parallel to the Z-axis.

The vertical slider 34 is engaged with the vertical chutes 322, and is slidable parallel to the Z-axis along the vertical chutes 322. The lateral crossbeam 36 extends from the vertical slider 34 and extends laterally along a direction parallel to the Y-axis. A lateral groove 362 is defined in the lateral crossbeam 36 and extends parallel to the Y-axis.

The lateral slider 38 is engaged with the lateral groove 362, and is slidable parallel to the Y-axis along the lateral groove 362. The horizontal slider 32, the vertical slider 34 and the lateral slider 38 are driven by external motors.

The tool spindle 40 is rotatably attached to the lateral slider 38 facing the base 31. The tool spindle 40 is rotatable in a vertical direction, i.e., a rotational axis of the tool spindle 40 is parallel to the Z-axis. The tool 42 is mounted on the tool spindle 40 and is rotatably driven together with the tool spindle 40. The tool 42 also can be positioned relative to in the X-axis, Y-axis, and Z-axis driven with sliding of the horizontal slider 32, the vertical slider 34 and the lateral slider 38. In this embodiment, the tool 42 is a cylinder-shaped grinding wheel. The tool 42 grinds the workpiece 46. Alternatively, the tool 42 can be a grinding stone or a diamond etc. The machining apparatus 30 is not only used in grinding, but also used in cutting.

Figure 2:
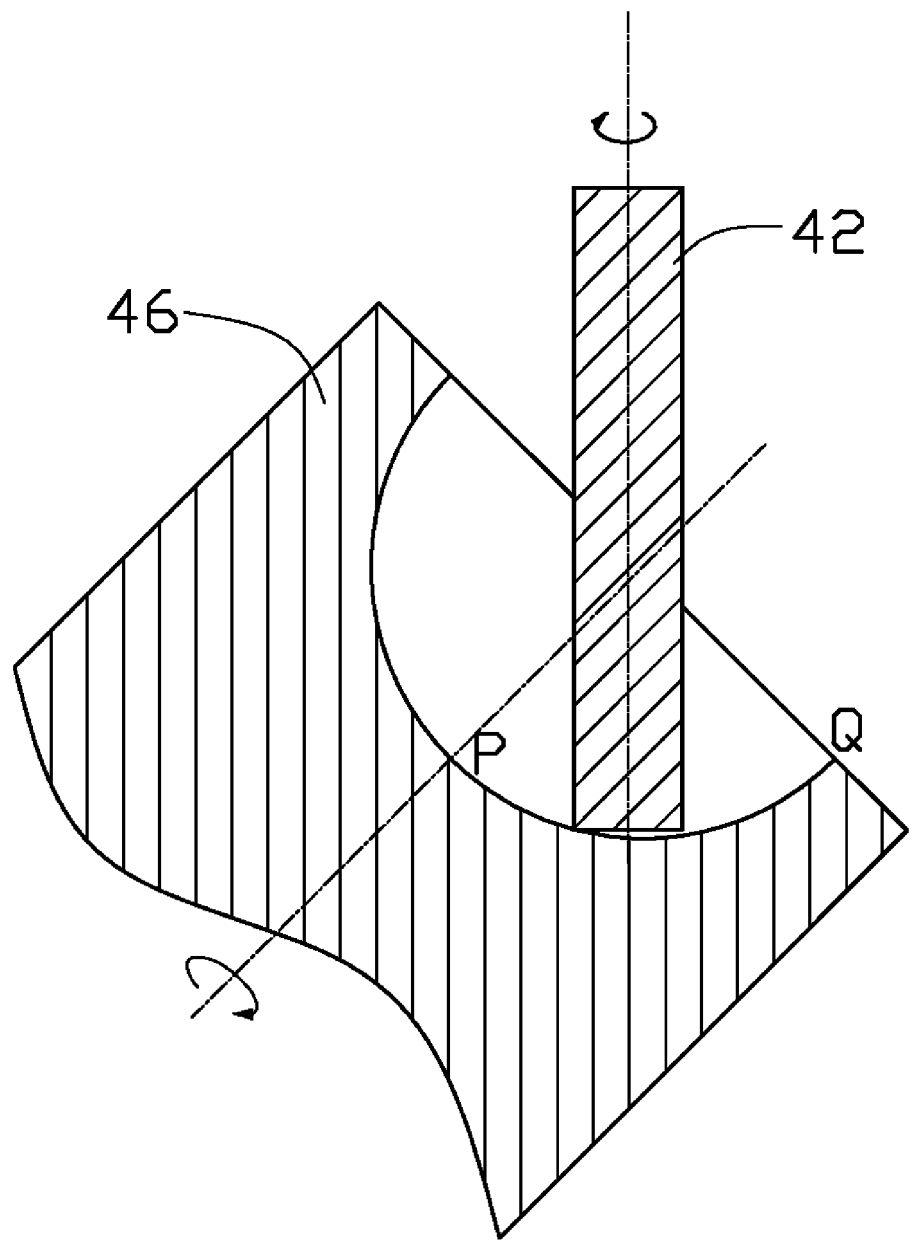
FIG. 2 is a partial, side cross-sectional view of the machining apparatus of FIG. 1.

The support 315 is fixed on the base 31. The workpiece spindle 44 is rotatably assembled to the support 315. Referring to FIG. 2, the workpiece spindle 44 is oblique relative to a sidewall of the support 315. That is, an axis of the workpiece spindle 44 is oblique relative to the X-Y plane (horizontal plane), i.e. oblique relative to the rotational axis of the tool spindle 40. In this embodiment, an angle defined by the axis of the workpiece spindle 44 relative to the rotational axis of the tool spindle 40 is 45 degrees. Alternatively, the angle can be larger than 0 degree and smaller than 90 degrees, and is preferred within 25-65 degrees. The workpiece 46 is mounted to the workpiece spindle 44 and rotates together with the workpiece spindle 44. An axis of the workpiece 46 is parallel to that of the workpiece spindle 44. That is, the workpiece 46 is oblique relative to the rotational axis of the tool spindle 40 also.

Figure 3:
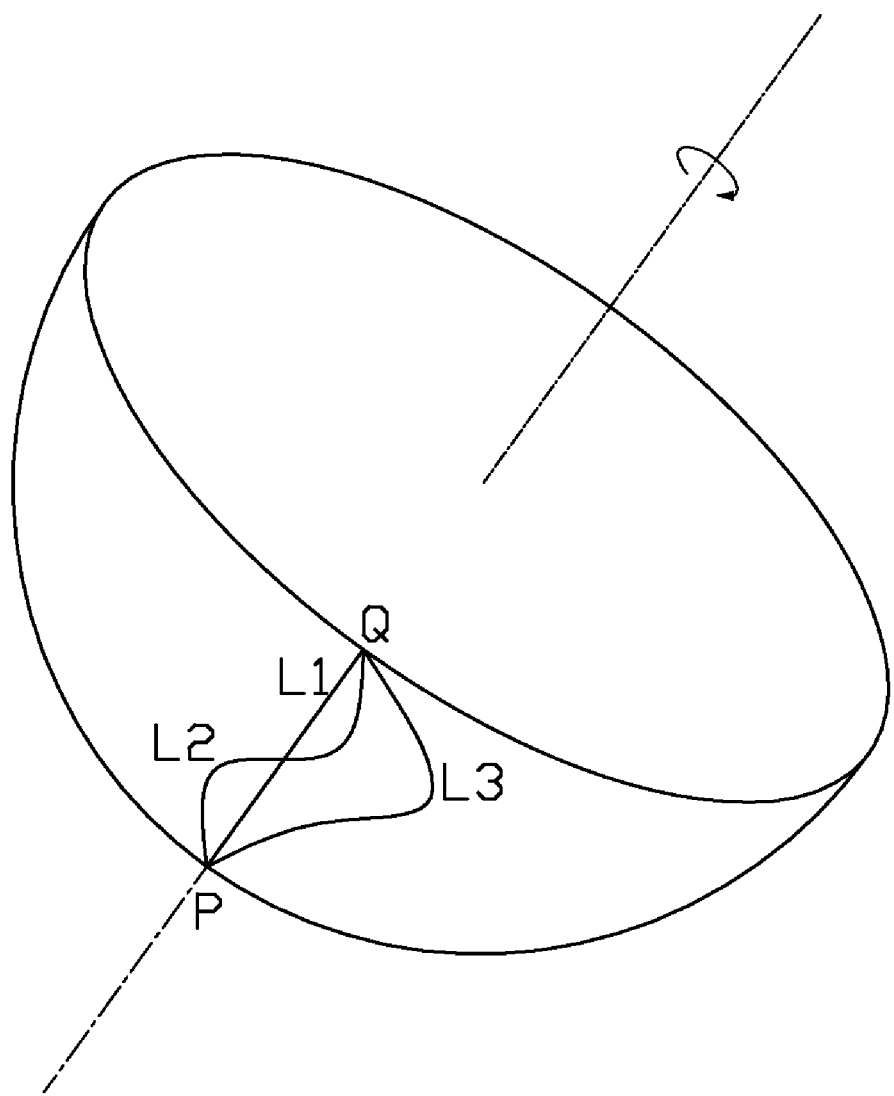
FIG. 3 is a path of a tool of the machining apparatus of FIG. 1.
Figure 4:
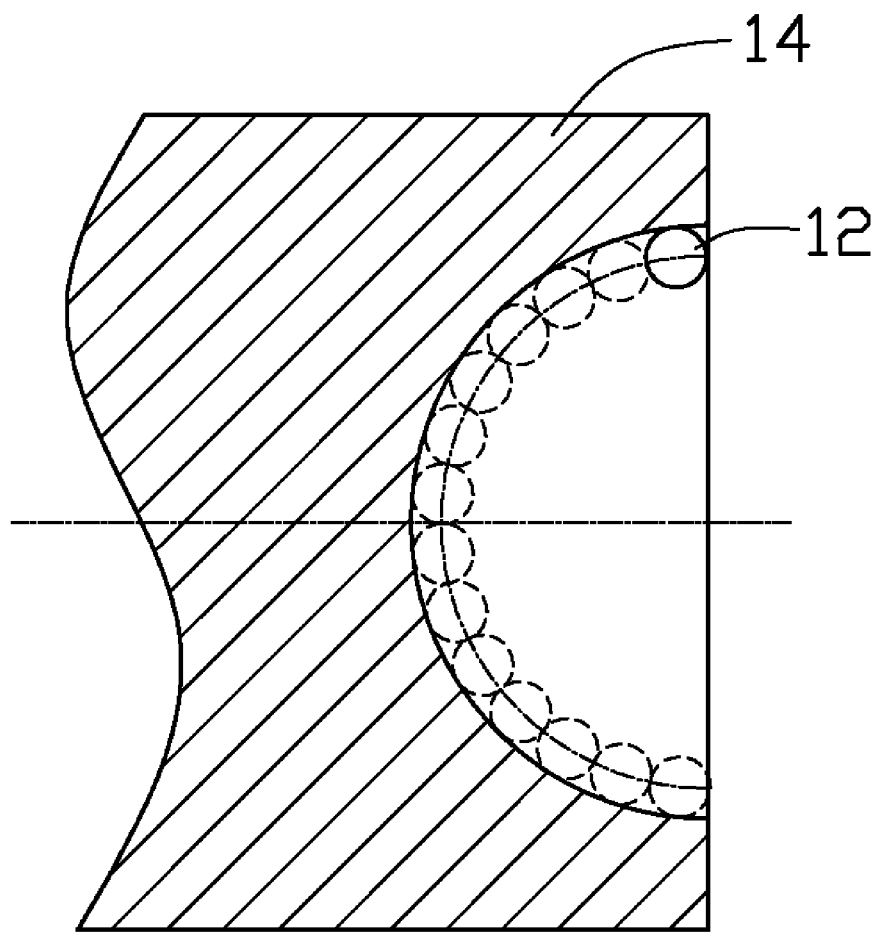
FIG. 4 is a partial, side cross-sectional view of a conventional machining device.
Figure 5:
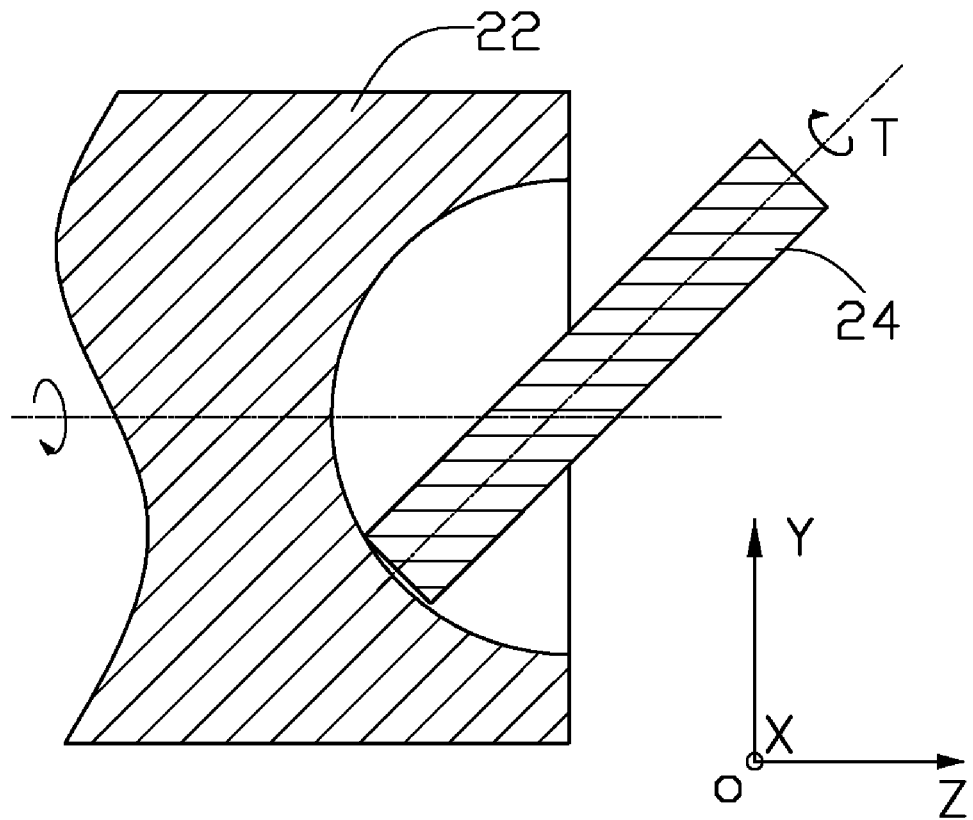
FIG. 5 is a partial, side cross-sectional view of a conventional machining device.

A machining process is described as follows. A predetermined curved surface of the workpiece 46 is a hemispherical concave surface. The external motors drive the tool spindle 40 and the workpiece spindle 44 to rotate. The tool 42 is driven to close and correspond to the workpiece 46 so that the tool 42 can reach to machine the workpiece 46. The external motors drive the horizontal slider 32, the vertical slider 34 and the lateral slider 38 to slide parallel to the X-axis, Z-axis, and Y-axis respectively, thereby bringing the tool 42 to move on the predetermined curved surface and pass through a top point and a point of an edge of the predetermined curved surface. During moving, the tool 42 machines the workpiece 46. Referring to FIG. 3, a path of a machining point of the tool 42 passes through the top point "P" and a point "Q" on the edge of the predetermined curved surface. The path can be any path passing through the points "P" and "Q" such as paths "L1", "L2" and "L3". Thereby, the workpiece 46 with the predetermined curved surface can be obtained with rotation of the workpiece 46.

In the machining process, the rotational axis of the tool spindle 40 is parallel to a direction of gravity of the tool spindle 40 and the tool 42, i.e., the vertical direction. Therefore, a component force of gravity of the tool spindle 40 and the tool 42 in a direction perpendicular to the rotational axis of the tool spindle 40 is zero, thereby shaking of the tool spindle 40 and the tool 42 is avoided. A precision of the machining apparatus 30 is improved accordingly. Under these conditions, the machining apparatus 30 can employ cheap tool spindle 40 such as a cheap air spindle, and an expensive special spindle is not necessary. Therefore, a price of the machining apparatus 30 can be reduced. Alternatively, the machining apparatus 30 can includes two or more tool spindles.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A machining method used to machine a predetermined curved surface on a workpiece comprising: (1) providing a machining apparatus, the machining apparatus comprising at least one vertical tool spindle for mounting a tool and a workpiece spindle being rotatable in an axis thereof, the at least one tool spindle being rotatable relative to a vertical direction, wherein a rotational axis of the workpiece spindle is oblique relative to a rotational axis of the at least one tool spindle, an angle defined by the axis of the workpiece spindle relative to the rotational axis of the tool spindle is 45 degrees, the machining apparatus further comprising at least one first rail parallel to one of the vertical direction, at least one second rail perpendicular to the first rail, at least one third rail perpendicular to the first rail and the second rail, a base, a horizontal slider, a vertical slider, a lateral crossbeam, and a lateral slider, the tool spindle being slidable in directions of the at least one first rail, the second rail, and the third rail, the base comprising two support beams and the second rail, the two support beams separately formed on a top surface of the base and extending parallely along the vertical direction, the horizontal slider slidably attached on the second rail, the first rail defined in the horizontal slider, the vertical slider engaged in the first rail, the lateral crossbeam extending from the vertical slider, the third rail defined in the lateral crossbeam, the lateral slider engaged with the third rail; (2) mounting the workpiece onto the workpiece spindle; (3) driving the spindle and the workpiece spindle to rotate, and positioning the tool corresponding to the workpiece; and (4) driving a machining point of the tool to move on the predetermined curved surface and along a path passing through a top point and any point of an edge of the predetermined curved surface.

2. The machining method as claimed in claim 1, wherein the tool spindle is rotatably attached to the lateral slider facing the base, the tool spindle is rotatable in a vertical direction, the tool is mounted on the tool spindle and is rotatably driven together with the tool spindle, the tool also can be positioned relative to in the X-axis, Y-axis, and Z-axis driven with sliding of the horizontal slider, the vertical slider and the lateral slider.

3. The machining method as claimed in claim 1, wherein the tool bed further comprises a support, the support is fixed on the base, and the workpiece spindle is rotatably mounted on the support.

\* \* \* \* \*